US007246367B2

(12) United States Patent
Iivonen

(10) Patent No.: US 7,246,367 B2
(45) Date of Patent: Jul. 17, 2007

(54) SYNCHRONIZED SERVICE PROVISION IN A COMMUNICATIONS NETWORK

(75) Inventor: Jukka-Pekka Iivonen, Helsinki (FI)

(73) Assignee: Nokia Corporation, Espoo (FI)

( * ) Notice: Subject to any disclaimer, the term of this patent is extended or adjusted under 35 U.S.C. 154(b) by 887 days.

(21) Appl. No.: 09/892,174

(22) Filed: Jun. 26, 2001

(65) Prior Publication Data
US 2002/0067909 A1 Jun. 6, 2002

(30) Foreign Application Priority Data
Jun. 30, 2000 (FI) ................................. 20001570

(51) Int. Cl.
*H04N 7/173* (2006.01)
*H04N 9/89* (2006.01)
*H04N 5/95* (2006.01)
*G06F 15/16* (2006.01)
*G06F 3/00* (2006.01)

(52) U.S. Cl. .......................... 725/102; 725/86; 725/88; 725/93; 725/97; 725/101; 386/16; 386/88; 709/217; 709/219; 715/741; 715/743; 715/753

(58) Field of Classification Search .......... 725/86–104; 715/741, 743, 753; 386/16, 88; 709/219
See application file for complete search history.

(56) References Cited

U.S. PATENT DOCUMENTS

| 5,561,637 A | * | 10/1996 | Dan et al. ............... 365/230.03 |
| 5,808,662 A | | 9/1998 | Kinney et al. |
| 5,815,662 A | * | 9/1998 | Ong ............................ 725/92 |
| 5,853,561 A | * | 12/1998 | Banks ......................... 205/646 |
| 5,918,213 A | * | 6/1999 | Bernard et al. ................ 705/26 |
| 5,937,331 A | * | 8/1999 | Kalluri et al. ............... 725/146 |
| 5,956,037 A | * | 9/1999 | Osawa et al. ................ 345/418 |
| 5,991,306 A | * | 11/1999 | Burns et al. ................. 370/429 |
| 6,047,288 A | * | 4/2000 | Kurosawa et al. ............. 707/9 |
| 6,263,503 B1 | * | 7/2001 | Margulis ...................... 725/81 |
| 6,278,466 B1 | * | 8/2001 | Chen ........................... 345/473 |
| 6,769,130 B1 | * | 7/2004 | Getsin et al. .................. 725/89 |
| 6,973,662 B1 | * | 12/2005 | Sie et al. ....................... 725/25 |
| 7,069,571 B1 | * | 6/2006 | Del Sesto et al. ............. 725/14 |
| 2005/0028208 A1 | * | 2/2005 | Ellis et al. ..................... 725/58 |

FOREIGN PATENT DOCUMENTS

WO WO 01/28183 4/2001

* cited by examiner

*Primary Examiner*—Chris Kelley
*Assistant Examiner*—Son P. Huynh
(74) *Attorney, Agent, or Firm*—Squire, Sanders & Dempsey L.L.P.

(57) ABSTRACT

The invention relates to the synchronized playback of video and/or audio recordings in terminals of a communications network. A server stores recordings including timing markers, each of which indicates an internal position within the recording. The system comprises groups of user terminals, at least one channel being assigned to each group. A recording is transmitted to the terminals belonging to the same group and stored there. In response to a start command, the playback of the recording is started at each terminal. Status information indicating at least the playback position of the recording is maintained, and the playback is controlled by transmitting new status information to the terminals of the group. The playback status is changed at each terminal according to said new status information.

19 Claims, 3 Drawing Sheets

SYNCHRONIZED SERVICE PROVISION IN A COMMUNICATIONS NETWORK

FIELD OF THE INVENTION

The invention relates generally to the transmission of video, audio and/or combined signals to a group of users in a communications network. More specifically, the invention relates to a method and a system for the synchronized playback of video and/or audio recordings in terminals of a communications network.

BACKGROUND OF THE INVENTION

The rapid growth in the number of Internet users and of services provided through the Internet has been one of the most remarkable phenomena in communications in recent years. Another current trend is the rapidly increasing use of various mobile terminals, such as laptops, PDA (Personal Digital Assistant) equipment, and intelligent telephones.

These two rapidly evolving network technologies, wireless communication and the Internet, are gradually converging to make the packet-switched data services used in the Internet available to mobile users. So far this converging development has occurred rather slowly, since most of the technology developed for the Internet has been designed for desktop computers and medium or high bandwidth data connections. It has therefore been difficult to introduce the IP-based (IP; Internet Protocol) packet services to the mobile environment, which is characterized by less bandwidth and poorer connection stability, as compared to fixed networks, and where the terminals have many fundamental limitations, such as smaller displays, less memory, and less powerful CPUs, as compared to fixed terminals. However, this development will occur at an increasing rate in the foreseeable future. This means that the services first introduced for fixed terminals will gradually be available also for mobile terminals.

One of the first multimedia services introduced for fixed terminals has been the so-called Video-on-Demand service, whereby viewers can use their telephone line to access a video server located in the network. Due to a reverse control channel from an individual user to the server, the service can be used in the same way as a conventional video cassette player, i.e. the film can be played backwards or forwards, stopped, or played in slow motion.

In these systems the users utilize the services independently of each other. One drawback resulting from this is that an arbitrary group of users, located separately from each other in the network, is not able to follow a recording in a synchronized manner so that the playback proceeds in the same phase for each user in the group. There are, however, many occasions when this would be desirable.

In known systems allowing synchronized listening and/or watching, the synchronization of the playback is based on a real-time video and/or audio signal sent to each terminal. This is a clear drawback since the real-time signal, such as a high quality video signal, requires a large bandwidth. Moreover, these systems are rigid in the sense that the transmitting party always acts as the master controlling the playback of the recording.

Thus, even though the present systems feature a reverse control channel from the user terminal to the server, several users wishing to follow a recording in a synchronized manner cannot utilize the system flexibly.

One objective of the invention is to obtain a system by means of which the above-mentioned drawbacks can be eliminated and multimedia services can be offered as flexibly as possible in a network where users located separately from each other may have the above-mentioned need.

SUMMARY OF THE INVENTION

This and other objectives of the invention are accomplished in accordance with the principles of the present invention by providing a system in which the users can form arbitrary playback groups for following a desired recording in a synchronized manner within the group. According to the present invention, recordings are utilized which are provided with markers throughout the bitstream for indicating the playback position within the recording, such as the time elapsed from the start of the recording. At least part of a recording to be played is transmitted to the terminals prior to the start of the playback and stored there. After the playback has started, the server of the system and the terminals of the group keep track of the playback status, at least as to the current position, but preferably also the speed and direction of the playback. Any changes in the playback status are transmitted to all terminals, and the playback is continued according to the new status information at each terminal. Thus, the recording itself, or at least a part of it, is transmitted through a non-real-time connection, whereas the control information controlling the playback is transmitted through a real-time connection during the actual playback of the recording.

In the system according to the invention, without the subscribers having to be in the same room, they can form groups within which a recording can be followed in a synchronized manner as if the group had an audio or a video player at its disposal, i.e. the recording can be played, rolled forward, and rewound in the desired manner. The recordings can be transmitted to the terminals when there is free bandwidth available between the server and the terminal, for example, when the terminal is playing a recording stored earlier. Information which is repeated often on a certain channel, such as advertisements or signature tunes, can be stored in advance in the terminals, whereby new information can always be transmitted and stored when the said repetitive information is played at the terminals, for example.

At least one of the parties is authorized to control the playback status of the recording. This party can be the server transmitting the bit stream and/or an individual subscriber.

In one preferred embodiment of the invention, the users of a group have different priority levels. The priority levels are preferably formed so that within each group the users have full rights to control the playback and, in addition to that, different priorities in case two users should control the playback simultaneously and differently from each other. The priority levels can also be formed in terms of different rights to control the playback. Some users may have full rights and some may have no rights at all (i.e. only the right to view and/or listen).

BRIEF DESCRIPTION OF THE DRAWINGS

In the following, the invention and its preferred embodiments are described more closely referring to the examples shown in FIGS. 1 to 5 in the appended drawings, wherein.

DETAILED DESCRIPTION OF THE INVENTION

Figure 1:
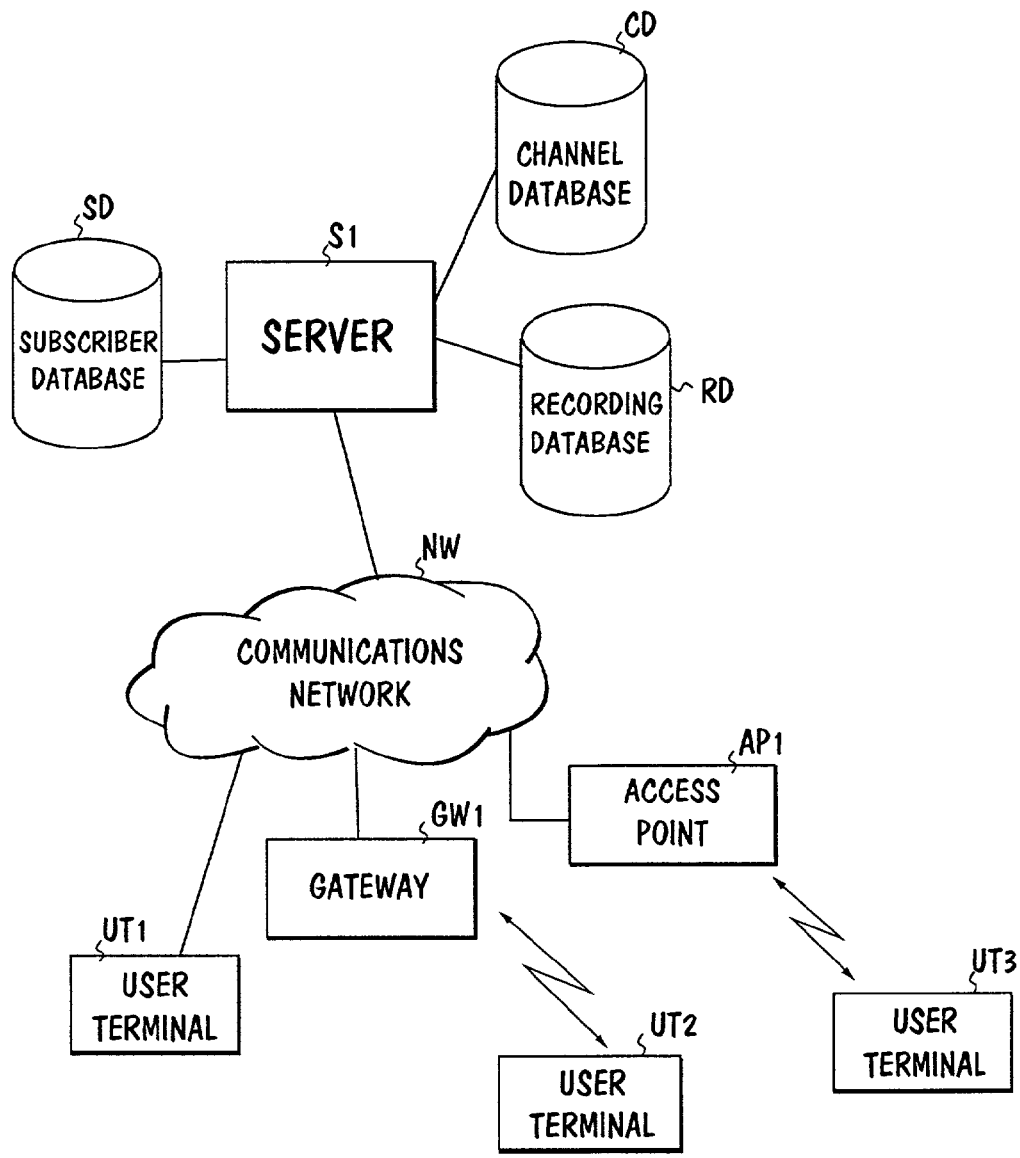
FIG. 1 illustrates the general architecture of the system according to the present invention.

FIG. 1 shows the architecture of the system according to the basic embodiment of the present invention. The core of the system is a server S1, which provides the services to the users of the system through a communications network NW. For example, the server can be a node of the Internet, an equivalent TCP/IP network, or a cellular network. The service typically consists of transmitting an audio and/or video stream to the users.

The connections between the server and the user terminals (UT1 to UT3) are implemented in a manner known as such. The user terminals can be fixed terminals, as shown in conjunction with terminal UT1, or, preferably, mobile terminals that have wireless access to the system or to the network, as shown in conjunction with terminals UT2 and UT3. Wireless access can be implemented through various access points (AP1) or alternatively through gateways (GW1) that translate the requests from the protocol used between the terminal and the gateway, such as WAP, to the protocol used between the gateway and the server, such as HTTP.

In terms of the inventive idea, the types of the user terminals and the connections between the user terminals and the server providing the service are not of significance. In this context, the essential features are that the terminals are provided with means for storing and playing the recordings transmitted from the server, as well as with browsers or other known client software by means of which the terminals can communicate with the server. A user of the system is typically also a subscriber of the service, although the terminals can be provided with smart card readers, for example, so that a user can use the smart cards of different subscribers. Thus, a subscriber is not necessarily a user. For example, an employee can be the user and the employer can be the subscriber.

The server includes several databases which include information on the system environment and on the operation of the system. The databases essential in view of the idea of the invention are the subscriber database SD, the recording database RD, and the channel database CD.

The subscriber database SD includes various kinds of information about the subscribers of the system, such as the contact information for each subscriber. The contact information includes at least the network address of the corresponding terminal, but preferably also other addresses needed, such as the billing address of the subscriber. In a preferred embodiment of the invention, the subscriber database further includes information on the user rights or on the priorities of the subscribers. This topic is discussed in more detail below.

Figure 2:
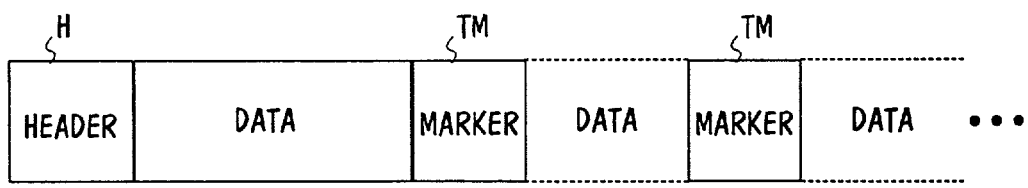
FIG. 2 illustrates the general structure of an individual recording in the recording database of the system.

The recording database RD stores the audio and/or video recordings which are at the users' disposal. The recordings can be stored in any known format, provided that the format is such that the stored data stream of each recording includes timing information which forms location references within the data stream. This allows the recording to be played backwards or forwards, with sufficient accuracy, to any desired position at an individual terminal. FIG. 2 illustrates the general structure of a recording stored in the recording database. The recording includes timing markers TM, which indicate an internal position within the recording. In other words, the recording includes markers which allow the recording to be rolled forward or rewound to a desired position. Each timing marker can indicate the time elapsed since the start of the recording, for example. Another alternative is that the recording comprises sequential data frames of fixed length, for example, 100 milliseconds, and the frames are provided with markers indicating the frame's ordinality in the sequence. The recordings can be stored in any known format fulfilling the above requirement of internal timing markers. These known formats typically include a header H with various kinds of information about the recording.

In the basic embodiment of the system the audio and/or video recordings are stored in connection with the server, as shown above. As discussed below, the storing of the recordings can also be distributed among the terminals or other network elements.

The channel database CD includes information on the channels used in the system. "Channel" refers here generally to a logical connection between the sending party and the receiving party. The physical implementation of the channel depends on the network, i.e. it can be a time slot in a TDM system or a virtual channel in a packet-switched system, for example. The users belonging to the same group subscribe to the same channel(s). In other words, they view and/or listen to the same channel.

Figure 3:
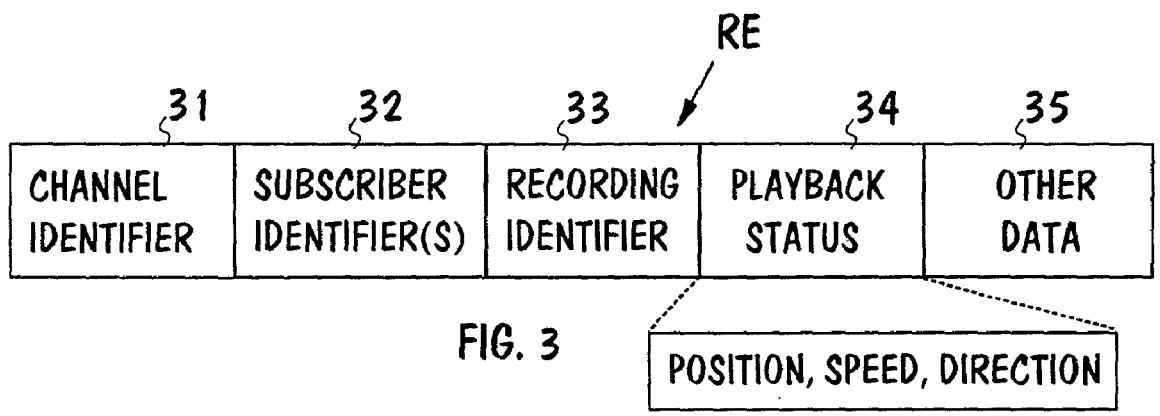
FIG. 3 illustrates the structure of a channel record in the channel database of the system.

The channel database preferably includes a record RE for each channel, an individual record being illustrated in FIG. 3. Each record RE includes at least an identifier field 31 indicating the identity of the channel in question, a subscriber field 32 indicating the subscriber(s) or user(s) currently on that channel, a recording identifier 33 indicating the recording being currently reserved for or played on the channel, and a playback status field 34 indicating the current state of the playback on the channel in question. The playback status field preferably includes real-time information on the current position, speed, and direction of the playback process. The channel record can further include other data, such as information as to which subscribers are allowed to control the playback of the recording and the mutual priorities of the said subscribers, for example.

In addition to the databases described above, the server can further include, for example, a billing database for storing various kinds of information relating to billing, such as the billing parameters of each subscriber and/or recording, and for storing the charging records generated in response to the services used. However, since charging does not relate to the actual inventive idea, it is not discussed in more detail here.

Before a recording can be played at the terminals, one or more playback groups must first be formed so that the server knows which terminals or subscribers belong to the same group. The formation of the groups is preferably dynamic so that the users can switch from one group to another if so desired. At least one downlink channel (i.e. a channel from the server to the terminals) is allocated to each group formed. The identifiers of the subscribers belonging to the group, and their priority hierarchy, are written in the record of that channel. These steps are performed by the server, but in a preferred embodiment the users can request a transfer to another channel.

After this, a recording is selected for the group from the recording database. This selection is preferably performed by one of the subscribers, i.e. one of the subscribers informs the server that a certain recording is to be played to the terminals belonging to the group. For this purpose, the terminals are provided with browsers for accessing the menu of the server, or the menu is stored in the terminals and the server updates the menu when necessary. The server then selects the recording in question and writes the identifier for the recording in the associated field (33) in the record RE of the channel allocated to the group. After this, the server sends the bitstream forming the recording to the terminals, and the bitstream is stored at each terminal. At least part of the recording is transmitted to the terminals prior to the start of the playback of the recording. As discussed below, an individual user can also produce the recording, such as a video clip, and send it to the server, which can either forward the recording directly to the group or store it for later playing.

Figure 4:
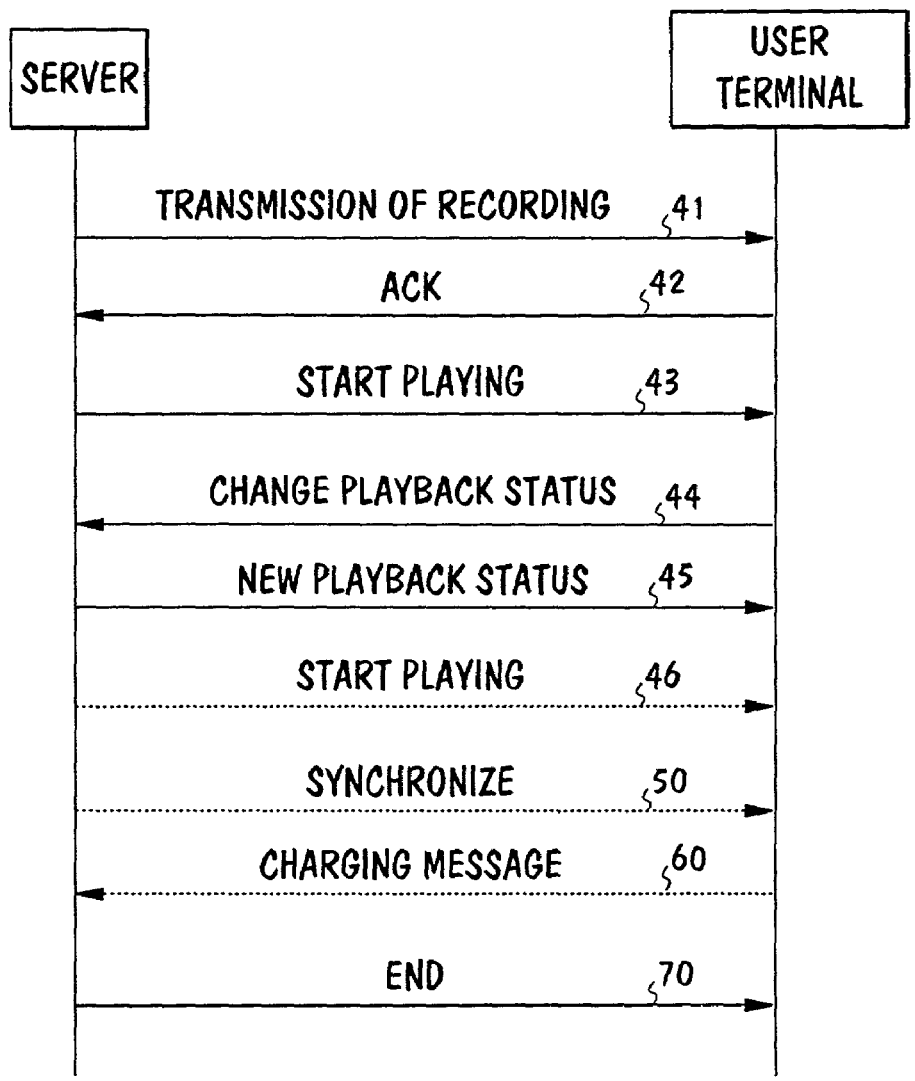
FIG. 4 illustrates the message exchange between the server and a terminal entitled to control the playback of a recording.

FIG. 4 illustrates the message exchange between the server and an individual terminal when a certain recording has been selected for a certain group of subscribers. The terminal in question is entitled to control the playback of the recording. First, the server sends the recording to all the terminals belonging to the group (step 41). Each terminal acknowledges the reception of the recording after it has stored the recording (step 42).

When all terminals belonging to the group have acknowledged the transmission, the server sends a start command to the terminals of the group (step 43), whereby the terminals start to play the recording. The recording transmitted or the start command can indicate the starting point and/or other parameters relating to the playback, such as the playback speed. The start command can also be sent by one of the users in the group. In this case the server merely sends a "transmission-complete" message to the terminals after the recording has been stored in all terminals, and one of the terminals entitled to control the playback starts the playback after the said message. The playback can also be started before the entire recording has been stored in the terminals, in which case the terminals start to play the part of the recording that has already been stored.

If a subscriber entitled to control the playback wants to change the status of the playback during the playback process, he or she sends a status command from his or her terminal (step 44). Having received the command, the server checks the rights of the subscriber in question. If the server notices that the subscriber has the right to control the playback, it sends a status message to all terminals (step 45). This message includes the new status information indicating the new position from which the playback is to be continued and the way the playback is to be continued. The terminals can start the playing in response to this message, after a predetermined delay, for example, which ensures that all terminals have moved to the new starting position. Alternatively, the same party that sent the initial start command can send a separate command (step 46) indicating when the playback is to continue from the new position.

In a preferred embodiment of the invention, the server further sends synchronization messages to the terminals to synchronize the clocks in the different terminals (step 50). In response to these messages the terminals slow down or speed up their playback, if necessary. Thus, in this respect the synchronization message is like a "stripped" status message; it updates the playback position without sending information about the changed position. The terminals can further send charging messages to the server (step 60) in order to allow the server to charge for the service. These steps are denoted with dashed arrows in the figure.

The server can also send the playback status information periodically to the terminals, i.e. not only at the moments when the status parameters are changed. If this approach is used, it is advantageous to include the status information in the synchronization messages sent. If the synchronization messages are sent frequently enough, the playback status can be updated by the next synchronization message, i.e. a separate status message need not be sent in response to a change command from the user, but rather the status can be updated by means of the next synchronization message. However, a more efficient way of utilizing the synchronization messages is to add complete status information into the message only if the status has changed between two successive synchronization messages.

If the playback is started before the whole recording has been stored in the terminals, it is possible that the playback proceeds so far that the storing of the recording is not yet ready in all terminals. If so, the playback can stop in all terminals, or the playback can continue in terminals which still have unplayed information left, while the other users can view a blank screen with a blinking message, for example. In the latter alternative the server can inform the terminals still playing the recording that the other users can no longer watch and/or listen to the playback. This notification can be seen on the screen of the terminal or heard as an audio signal, for example. The channel record (FIG. 3) can further include in a situation like this a field indicating (a) whether the playback is to be stopped in all terminals or continued in terminals having unplayed information left, and (b) whether the playback is to be started automatically on the channel.

The user terminals and the server can further evaluate the delay and/or delay variation caused by elements in the communications network NW. This can be carried out in a known manner, for example, by utilizing NTP (Network Time Protocol), which is a protocol built on top of the TCP/IP for assuring accurate timekeeping on the Internet. In response to the evaluation, the interpretation of a synchronization or status message may change in the terminal. For example, if the terminal notices that the delay or delay variation is greater than a predetermined limit value, it can ignore the synchronization message and wait for the next synchronization message.

As discussed above, in a preferred embodiment of the system the subscribers are classified into different categories in terms of their rights to control the playback process. One way of implementing this is to assign different priorities to the subscribers so that if two or more users send different status commands simultaneously, the command from the user with the highest priority is taken into account and others are omitted. In this way all users can have full control of the playback as long as there are no simultaneous control commands. Another alternative is to classify the users in terms of the control operations allowed for each user. There can be several control categories between full control rights and no rights at all. The category next to the highest one can, for example, allow all other control operations, except changing the recording. The two approaches can also be combined so that within each control category the users belonging to that category have mutual priorities.

Figure 5:
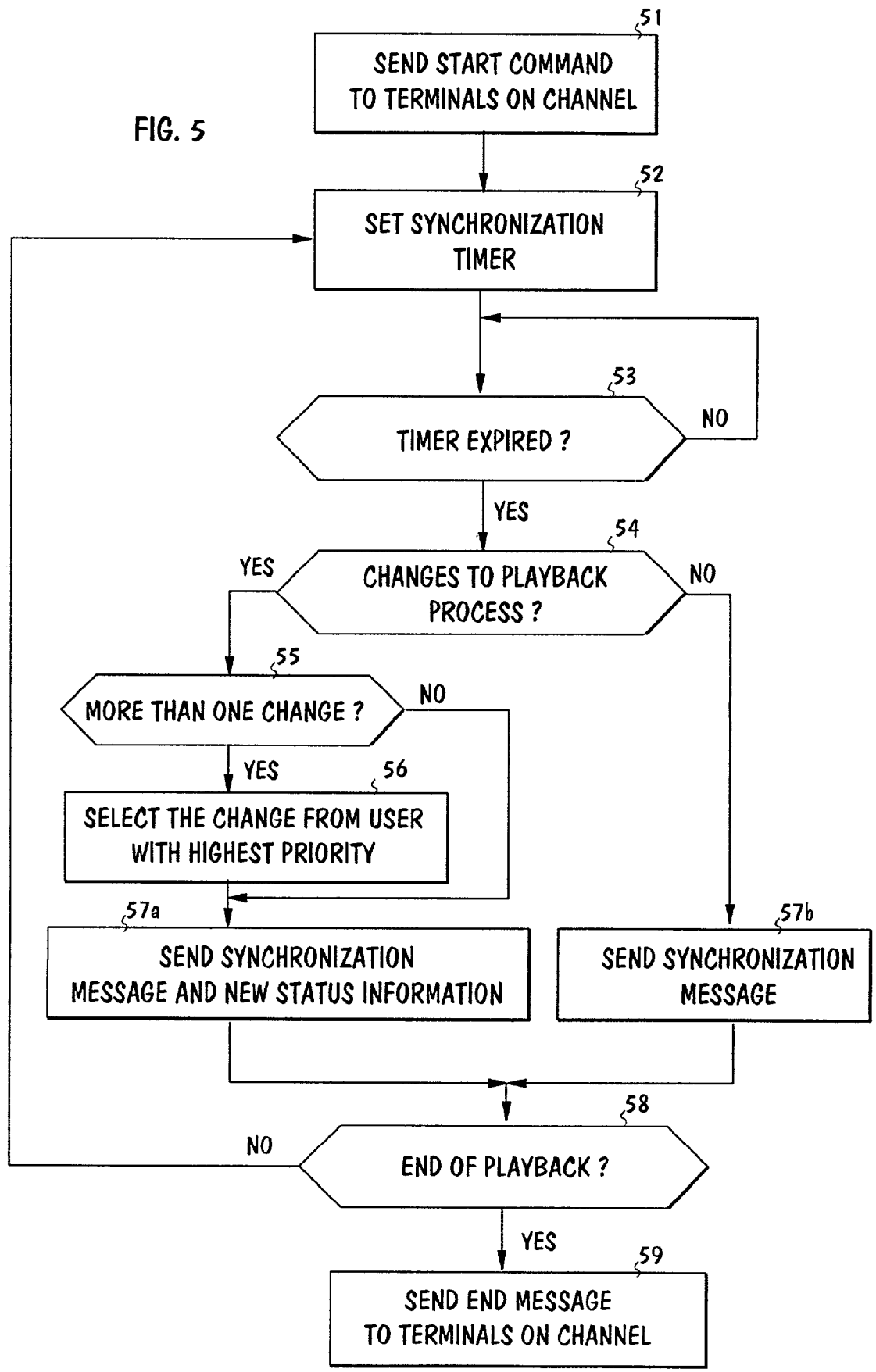
FIG. 5 is a flow diagram illustrating the operation of the server.

FIG. 5 illustrates the operation of the server during the playback process, i.e. after the group has been formed and at least part of the recording has been stored in the terminals. The figure shows an embodiment whereby the users of the group have different priorities and the server periodically sends synchronization messages to the terminals of the group. When the playback is due to begin at each terminal, the server sends each terminal a start command (step 51 and step 43 in FIG. 4) and sets a synchronization timer to expire when the next synchronization message is due (step 52). The server continuously monitors the messages coming from the terminals in order to detect if any of the users want to change the playback status of the recording, i.e. if any of the users want to change the current playback position and/or the speed of the playback, for example. If such messages are detected, they are stored and taken into account (step 54) in connection with the next synchronization message. If two or more change commands have arrived since the previous synchronization message, the server selects the command from the user with the highest priority (steps 55 and 56) and informs the terminals about the new status of the recording in connection with the synchronization message (step 57*a*). This message thus includes the new playback status according to the request from the user with the highest priority of those who sent their requests since the latest synchronization message. If none of the parties wants to change the playback position before the timer expires, the server sends a normal synchronization message (step 57*b*). The server then sets the timer again if the end of the recording has not been reached. When the end of the recording has been reached, the server sends a confirming end message.

In a further embodiment of the invention, one or more of the users can send the control commands directly to the other members of the group, i.e. the server does not send the new status information. Moreover, more than one downlink channel can be reserved for the group. The recording can be transmitted through one channel by the server, and the control information through another channel, by either the server or a terminal. The service can also be a combined service so that more than one data stream is transmitted to the terminals from one or more servers.

A user can set up a new group and determine the users who are allowed to join the group. A user can further determine which users are entitled to perform certain operations, such as changing the recording or transmitting real-time information on the channel of the group.

As described above, the system according to the invention can be used for following a video and/or audio recording in a synchronized manner within the group. Two users can, for example, view the same video clip; after the video clip has been transmitted to both terminals, the users can further establish a speech connection between themselves and discuss the video during the playback.

The system can also be used for teaching purposes. In a dancing-school, for example, each dancing pair forms a group on a separately assigned channel and listens through earphones to a certain recording while dancing. When supervising a certain pair the dancing master can transfer to the channel of that pair to listen to the recording on their channel. When noticing a mistake, he or she can interrupt the recording, advise the pair, rewind the recording, and then start the playback again. Simultaneously, other pairs can go on dancing without interruption.

As mentioned above briefly, the server does not have to store all the recordings, but rather each terminal or another network element can store one or more of the recordings. If all the recordings are stored in terminals or other network elements, the server referred to above can assume a managing role by keeping records indicating where each recording is stored and other relevant information about the recordings. A terminal storing a recording for the entire system then sends the recording to the other terminals, either directly or via the server. If the recording is sent directly to the other terminals, the server is informed of the transfer status. If the recording is sent via the server, the server buffers the data stream and forwards it to the other terminals (whereby the server automatically knows the transfer status). The terminals can also produce recordings, such as video clips, for the use of one or more groups. These recordings are then stored in the server or in the terminals. In the latter case the server assumes the above-mentioned managing role.

The recordings can also be encrypted so that the network elements forwarding the data stream cannot read the contents of a recording. The sending party can encrypt the recording by means of the public encryption key of each recipient. This encryption is preferably carried out in successive blocks that correspond to the period between the timing markers. In this way the server knows the transfer status of a recording which it is receiving from a terminal. Alternatively, the timing markers can be added to the encrypted recording. However, in this case the encryption algorithm has to ensure that the characters are shifted locally, so that part of the recording can be decrypted without having the whole recording available. The recipients then decrypt the recordings using their private encryption keys.

It is also possible that the recordings are not transmitted directly to the terminals, but to an intermediate network element, such as the access point described above, which has a fast connection to one or more terminals (and a slower connection to the network). Thus, another network element can operate as the user terminal described above. Consequently, "user terminal" refers here to any network element capable of storing the recordings and controlling the playback as depicted above.

As also mentioned above, the system can be integrated into other systems, preferably into a mobile network, by means of which communication channels concurrent with the playback channel can be set up between the users. Thus, the users of the system are preferably also subscribers or users in a communications network. The server of the system can then be located in connection with another network node, such as a mobile services switching center. The terminals can thus be compatible with existing or future (2G, 3G, . . . ) mobile systems, such as GSM, HSCSD, GPRS, EDGE, UMTS, etc., and they can support mobile multisystem environments (such as GSM/UMTS+WLAN+Intranet, IPsec, Bluetooth, etc.).

Although the invention was described above with reference to the examples shown in the appended drawings, it is obvious that the invention is not limited to these, but that it may be modified by those skilled in the art without departing from the scope and spirit of the invention.

The invention claimed is:

1. A method for providing synchronized service in a communications network, the method comprising:
   forming at least one group of user terminals, wherein each of the user terminals are assigned different rights to control a playback of a recording and allocating at least one channel to an individual group;
   transmitting a recording to the user terminals of a group thus formed, each recording including timing markers, each of which indicates an internal position within the recording;
   storing at least part of the recording prior to its playback at each user terminal, wherein the storing further includes storing the timing markers;
   sending a start command to each user terminal of the group;
   in response to the start command, starting the playback of the recording at each user terminal;

maintaining status information for the recording, the status information indicating at least the playback position of the recording;

transmitting a status message to the user terminals, the message indicating new status information concerning the recording;

changing the playback status at each user terminal according to said new status information; and controlling the playback in the plurality of user equipment by utilizing at least information received in a message from a user terminal with highest priority by utilizing the stored timing markers, wherein the communications network includes user terminals and servers providing services to the user terminals through at least one channel.

2. A method according to claim 1, further including storing the recordings in a server.

3. A method according to claim 2, including initiating the start command at the server.

4. A method according to claim 2, including initiating the start command at a user terminal.

5. A method according to claim 2, including sending the status message from the server.

6. A method according to claim 5, including sending the status message in response to a status command from a user terminal.

7. A method according to claim 1, wherein the forming includes forming several user groups.

8. A method according to claim 1, wherein the storing includes storing of the whole recording prior to its playback.

9. A method according to claim 1, including the status information further indicates at least the direction and the speed of the playback.

10. A method according to claim 1, further comprising:
assigning different priorities to the user terminals of a group,
sending new status information from more than one terminal, and
generating the status message on the basis of the status information sent from the terminal with the highest priority of said more than one terminals.

11. A method according to claim 1, further comprising
assigning each terminal predetermined control operations by means of which the terminal is entitled to control the playback,
sending new status information from a terminal,
checking the control operations assigned to said terminal, and
generating the status message in response to said checking.

12. A system for providing synchronized playback of recordings in a communications network with transmission channels, the system comprising:
a server configured to manage recordings stored within the system,
user terminals configured to store and play the recordings, and
transmission unit configured to transmit the recordings to the user terminals through at least one channel,
wherein each recording includes timing markers (TM), each of which indicates an internal position within the recording, wherein the timing markers are stored with the recordings, and that the system further includes
first management unit configured to maintain information on user groups formed in the system, the information indicating the user terminal(s) belonging to each group, the channel(s) assigned to each group, and the recording(s) being used by the group, wherein each of the user terminals belonging to a group have different priority rights for controlling playback of a recording;
second management unit configured to maintain status information for said recordings, the status information indicating at least the playback position of the recording,
first control unit configured to send status information to the user terminals of a group, and
second control unit at each user terminal, responsive to the first control means, configured to control the playback in the user terminal according to said status information,
wherein the playback of the recording in the plurality of user equipment is controlled at least by utilizing information received in a message from a user terminal with highest priority and by utilizing the stored timing markers.

13. A system according to claim 12, wherein the system further includes a centralized database for storing the recordings.

14. A system according to claim 12, wherein the status information further indicates the direction and the speed of the playback.

15. A system according to claim 12, wherein the first management unit reside in the server.

16. A system according to claim 12, wherein the first control unit resides in the server.

17. A system according to claim 12, wherein the second management unit resides at least in the server.

18. A system according to claim 12, wherein user terminals are terminals of a mobile network.

19. A system for providing synchronized playback of recordings in a communications network with transmission channels, the system comprising;
a server for managing recordings stored within the system,
user terminals for storing and playing the recordings, and
transmission means for transmitting the recordings to the user terminals through at least one channel,
wherein each recording includes timing markers (TM), each of which indicates an internal position within the recording and are stored with the recording, and that the system further includes
first management means for maintaining information on user groups formed in the system, the information indicating the user terminal(s) belonging to each group, the channel(s) assigned to each group, and the recording(s) being used by the group, wherein each of the user terminals belonging to a group have different priority rights for controlling playback of a recording;
second management means for maintaining status information for said recordings, the status information indicating at least the playback position of the recording,
first control means for sending status information to the user terminals of a group, and
second control means at each user terminal, responsive to the first control means, for controlling the playback in the user terminal according to said status information,
wherein the playback of the recording in the plurality of user equipment is controlled at least by utilizing information received in a message from a user terminal with highest priority and by utilizing the stored timing markers.

* * * * *